United States Patent [19]
Rainbolt

[11] Patent Number: 6,038,820
[45] Date of Patent: Mar. 21, 2000

[54] CABLE AND PANEL FABRIC

[75] Inventor: John Rainbolt, 24985 Soquel San Jose Rd., Los Gatos, Calif. 95033

[73] Assignee: John Rainbolt, Los Gatos, Calif.

[21] Appl. No.: 09/349,578

[22] Filed: Jul. 8, 1999

[51] Int. Cl.$^7$ .................................................. E04D 11/00
[52] U.S. Cl. ............................. 52/83; 52/3; 52/5; 52/23; 52/63; 52/745.06; 135/123
[58] Field of Search ................................. 52/2.25, 2.26, 52/3, 4, 5, 23, 63, 83, 149, 222, 273, 745.06; 135/121, 123; 160/183, 168.1 R, 179

[56] References Cited

U.S. PATENT DOCUMENTS

| | | | |
|---|---|---|---|
| 411,163 | 9/1889 | Miller | 160/183 X |
| 1,095,484 | 5/1914 | Wright | 52/4 |
| 3,134,200 | 5/1964 | Moss | 52/222 X |
| 3,564,784 | 2/1971 | Mollinger | 52/222 X |
| 3,886,961 | 6/1975 | Geiger et al. | 52/63 |
| 4,450,656 | 5/1984 | Lagendijk | 52/63 |
| 4,574,534 | 3/1986 | Beaton | 52/63 |
| 5,375,642 | 12/1994 | Gaber et al. | 160/168.1 |
| 5,400,549 | 3/1995 | Morgan | 52/5 X |
| 5,845,694 | 12/1998 | Cohen | 160/168.1 R |
| 5,862,633 | 1/1999 | Van Ells | 52/3 X |

OTHER PUBLICATIONS

Ann Talmadge, Problem Solving Report, Mar. 18, 1999, NERAC, Inc.
Ann Talmadge, Problem Solving Report, Mar. 19, 1999, NERAC, Inc.
Author unknown, Munich's Olympic Games Site Topped By Cable–Suspended Roof, Sep. 23, 1971, Eng News–Rec.

*Primary Examiner*—Beth A. Aubrey
*Assistant Examiner*—Brian E. Glessner
*Attorney, Agent, or Firm*—Hickman Stephens Coleman & Hughes, LLP

[57] ABSTRACT

The present invention provides a fabric, consisting of multiple cables and multiple panels, for roofing applications. The cables are arranged in sets of three over the area to be covered, and the panels are suspended between the cable sets to complete the fabric. Specifically, each panel has four attachment points and is suspended between two adjacent cable sets such that it attaches to two of the three cables in each set on either side of it. More specifically, each panel attaches to the middle cable of the two sets on either side, and to the top cable in one set and the bottom cable in the other set. This particular arrangement creates overlapping rows of overlapping panels that viewed from one perspective resembles overlapping shingles on a conventional roof, however, when viewed from another perspective reveals that the individual panels are held apart by the cable sets to allow air and light to diffuse through.

13 Claims, 9 Drawing Sheets

CABLE AND PANEL FABRIC

BACKGROUND OF THE INVENTION

This invention relates generally to the field of shelters and more specifically to roofs and coverings for living spaces and outdoor areas.

Shelter is a basic human need. As mankind has evolved, shelters have also evolved, from the simplest caves to present day buildings of steel, concrete, and glass. While skyscrapers may stand out as crowning achievements of modem building design, most people continue to live in modest wood-flamed homes. As the world's population continues to increase the demand for more housing also increases, yet the available supply of building materials such as lumber continues to decrease. Consequently, there is a growing need for housing alternatives that rely less on lumber and more on other types of construction materials. Replacing lumber with materials that would otherwise constitute waste products would have obvious environmental benefits. Further environmental benefits may be realized by optimizing both the efficiency and the usability of the spaces we build.

One alternative to wood-framed houses that makes use of a material that would otherwise constitute a waste product is straw bale houses. In a home built with straw bales, walls are assembled from stacked bales of straw held in place by re-bar that is secured in the foundation. The walls are enclosed by chicken wire with plaster on the interior and stucco on the exterior to protect the straw bales from the elements. Straw bale homes offer very good insulation, inexpensive construction, and use little lumber. They are also very fire and earthquake resistant. Unfortunately, straw bale homes still rely on conventional roofing systems when a pitch is necessary to shed water.

Prior art FIG. 1 illustrates a typical framing arrangement for a lumber truss roof 2 common to many wood-framed and straw bale homes. Besides the reliance on lumber, another disadvantage of this type of roof is the manner in which they are braced. Beams 4 for bracing the roof divide the interior space into numerous triangular regions. These triangular regions are not conducive for placing straw bales for ceiling insulation because the bales do not fit well into the comers and because it is difficult to move the bales around within the triangular regions. In addition, traditional pitch systems make it impractical to use the roof space for living area. Consequently, attic spaces enclosed by traditional lumber roofs, whether on straw bale homes or conventional wood-framed homes, commonly are poorly utilized.

Accordingly, what is desired is a roofing system that reduces the use of lumber, that is inexpensive and easy to assemble, that allows for the installation of straw bale ceiling insulation, and that creates a livable space that is open and aesthetically pleasing.

SUMMARY OF THE INVENTION

The present invention provides for a fabric comprising cables and panels ideally suited both as a roofing for a living space and as a covering for an open area According to an embodiment of the present invention, multiple cable sets, consisting of three cables each, are arranged to form a desired shape of a roof or area covering. Panels spanning the spaces between the cable sets complete the fabric. Each panel has four attachment points, and at each attachment point a coupling mechanism secures the panel to a cable such that each panel is secured to two of the three cables on either side of it. More specifically, every panel in the fabric attaches to the top and middle cables on one side, and attaches to the middle and bottom cables on the other side. According to this arrangement, panels overlap much as shingles overlap on a conventional roof. However, in contrast to a conventional set of roofing shingles, the cables of the present invention hold the panels apart so that they need not touch one another. In this way the fabric presents a closed appearance similar to a conventional set of overlapping roofing shingles when viewed from one perspective, while viewed from another perspective the fabric presents an open weave. This fabric, therefore, provides the advantages of being substantially rain-proof when the closed perspective is vertically oriented towards the sky, while at the same time allowing substantial air and light to diffuse through from the horizontal open perspective.

Embodiments of the present invention take a variety of shapes and sizes. Simple embodiments provide for a fabric that is substantially planar. Such planar fabrics may be formed into simple geometric shapes such as squares and rectangles and may be suitable for awnings, one-sided roofs, shade for garden areas, and the like. Such fabrics may be held in place by securely fastening opposite ends of each cable set to a straight support member. Alternately, in place of one support member, individual cable sets may be attached to independent footings secured to the ground. Further embodiments are directed to more complex planar shapes, and still other embodiments include non-planar shapes such as truncated cones. These more complex shapes may be suitable for covering amphitheatre seating, building entrances, outdoor cafe seating, and similar applications where a more aesthetically pleasing appearance is desired.

Additional embodiments are directed to fabrics with adjustable panels that allow the fabric to be made more or less open. In one such embodiment opposite support members rotate in unison to bring the top and bottom cables in each set closer to the middle cable, thus tending to close off the spaces between panels. In another such embodiment each cable set may be rotated around an axis defined by the central cable. By rotating all of the cable sets in unison, either clockwise or counter-clockwise, the distance between adjacent panels can be varied. Further embodiments are directed to adjustable fabrics where the cables are brought closer together, for example, by pinching or sliding adjustments. The advantages of an adjustable fabric include the ability to alter the amount of air and light coming through, and the ability to close the fabric during periods of rain and high winds.

A further embodiment is directed to a method for constructing a fabric of cables and panels. In the disclosed method all of the panels are set out in rows, with successive rows layered on top of one another, such that similarly situated panels in successive rows form columns. Cables are attached to their corresponding coupling mechanisms on each panel and then to support members. The support members are separated from one another until the cables are drawn taught, and then the panels are positioned such that they are uniformly spaced, specifically so that panels within rows, and the rows themselves, overlap each other by substantially the same amount.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 1:
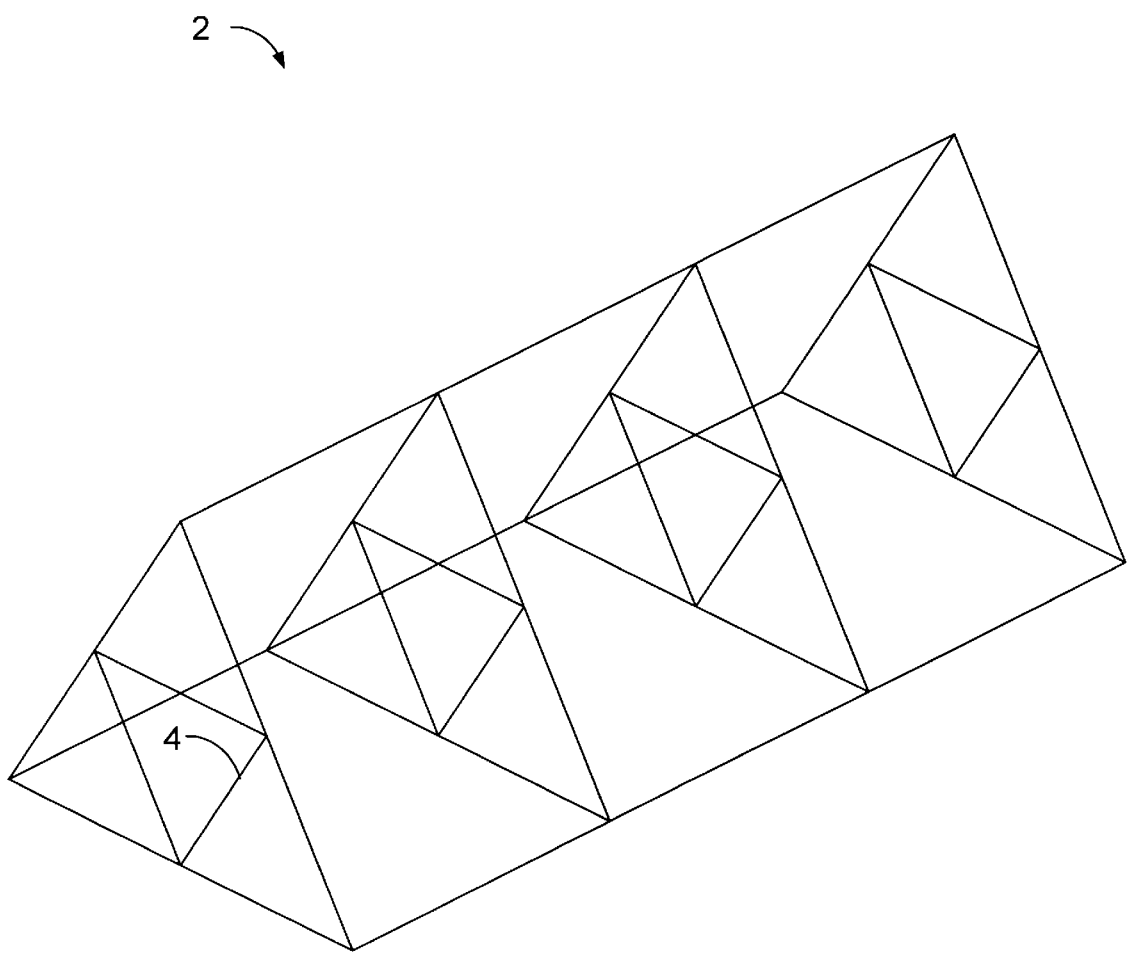
FIG. 1 is an elevational view of a typical framing arrangement for a lumber truss roof of the prior art.

FIG. 1 was discussed with respect to the prior art.

Figure 2:
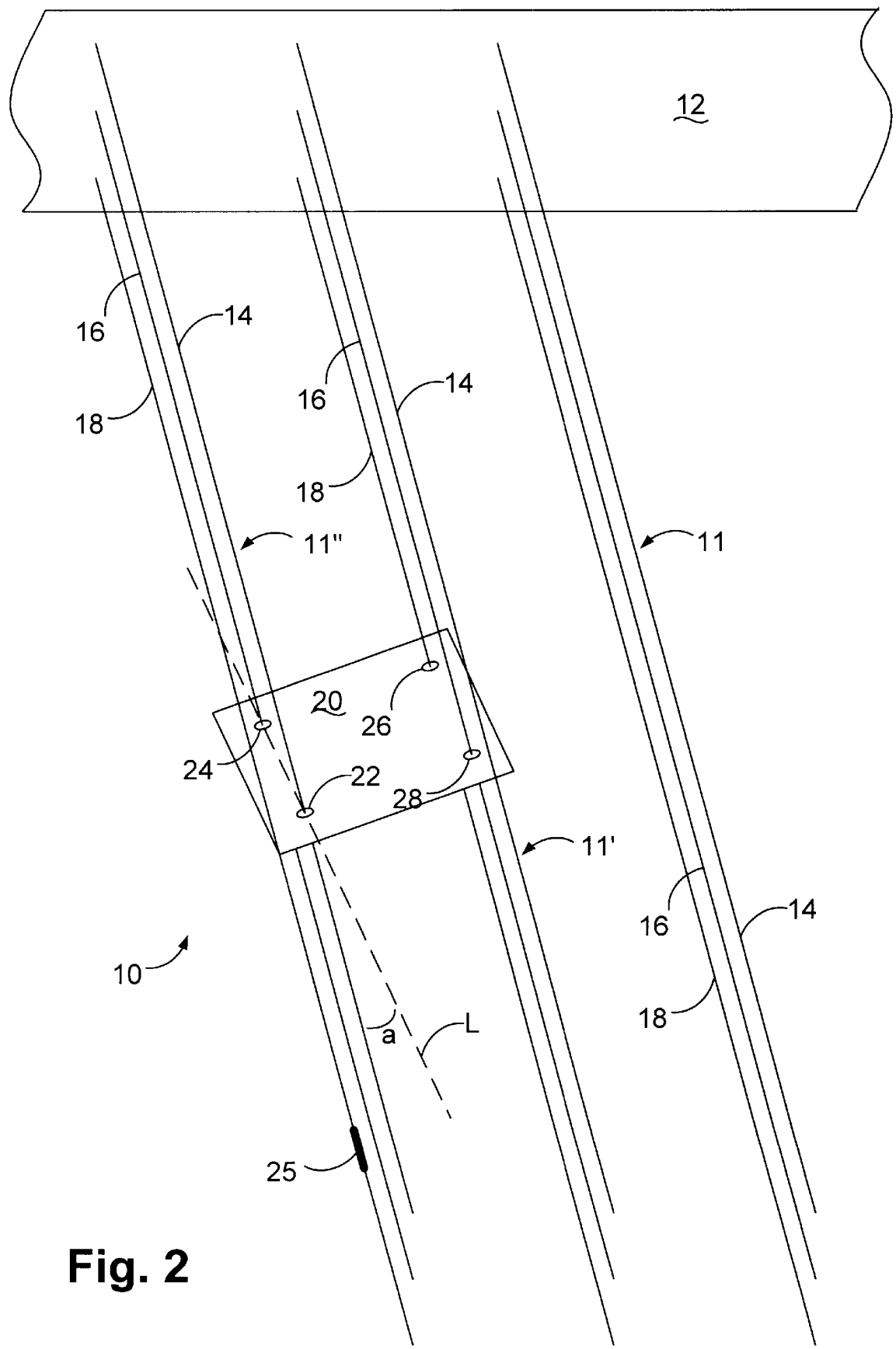
FIG. 2 is an elevational view of cable sets of the present invention supporting a single panel.
Figure 3:
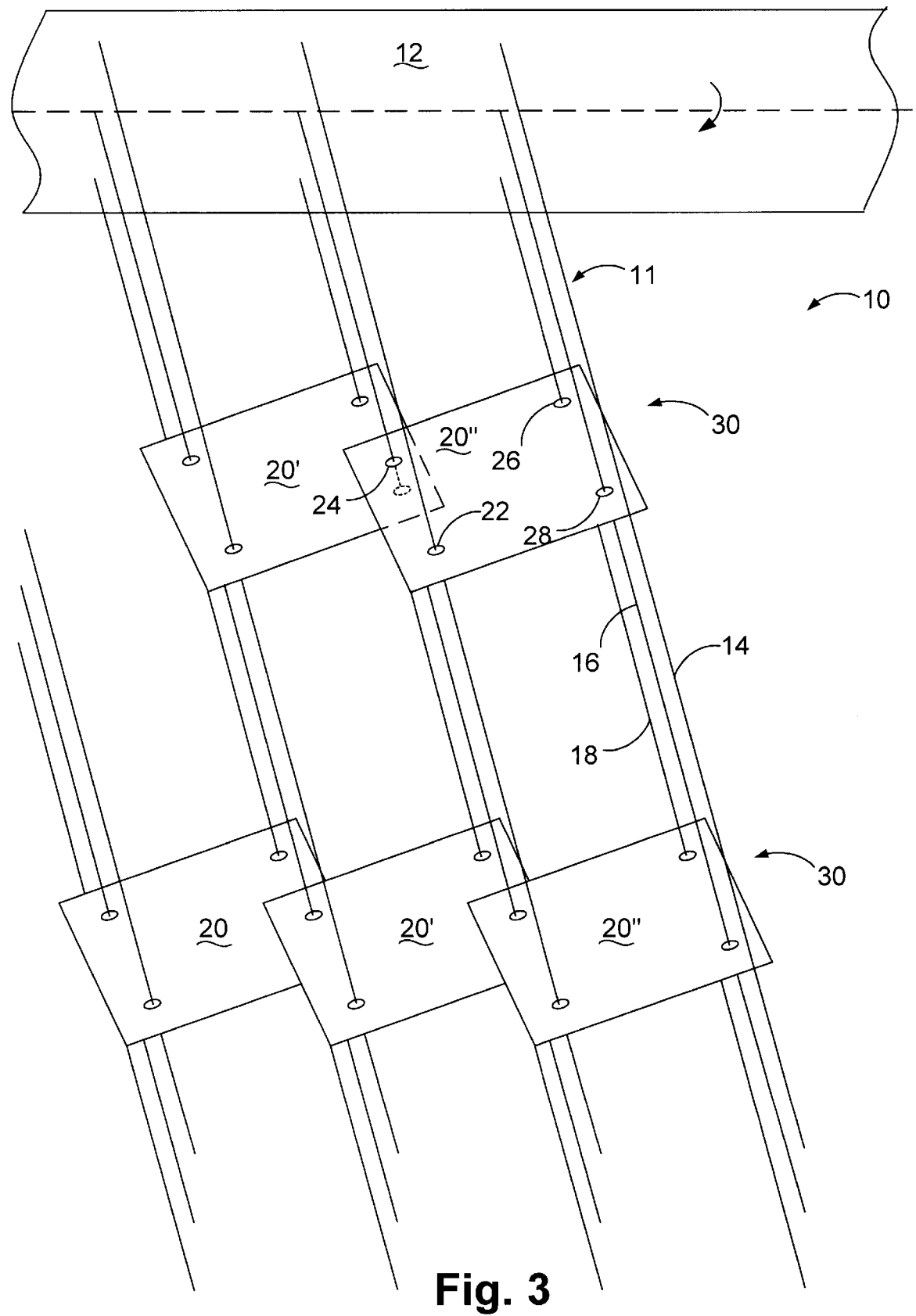
FIG. 3 is an elevational view of cable sets of the present invention supporting panels in two rows to form a fabric.

FIG. 2 illustrates a fabric 10 comprising cable sets 11 spanned by panels 20. For the sake of simplicity, the fabric 10 in this illustration has been reduced to a single panel 20 spanning two cable sets 11' and 11". FIG. 3, discussed more fully below, illustrates the arrangement of multiple panels spanning several cable sets.

The arrangement of cable sets 11 defines the overall shape of the roofing or covering. A simple embodiment of the present invention has all cable sets 11 arranged parallel one another to define a plane, as shown in FIGS. 2 and 3. Such an arrangement may be useful for a simple roof, an awning, or the like. Two such planes that come together at a common line may form the familiar inverted V-shaped roof. More complex embodiments may form more complex shapes. For example, cable sets 11 may be arranged in a plane as radial spokes diverging from a central point to form a circle. Alternately, cable sets 11 may be arranged in the form of a cone, to create a conical enclosure. A cone formed of cable sets 11 may either come to a point at the apex where all cable sets 11 converge, or alternately, a truncated cone may be formed by having the cable sets 11 diverge from a common ring. More complex embodiments involving arches, categories, and planar surfaces having a twist around an axis are all possible. Additional complexity can be created by varying the lengths of the individual cable sets 11 to form, for example, a planar surface shaped like an oval. Roofs and coverings in many different shapes and sizes defined by the arrangement of cable sets 11 may be useful for covering homes, commercial buildings, patios, pools, playgrounds, ampitheatre seating, parking structures, stadiums, and as ornamental structures.

A cable set 11 consists of a first cable 14, a second cable 16, and a third cable 18. The three cables comprising the cable set 11 define a plane. Within the plane defined by cable set 11 the three individual cables 14, 16, and 18 may either be substantially parallel one another, else they may diverge from one another. The cables may be formed of many different materials including, for example, single-strand metal wire, braided metal wire, rope, monofilament plastic, plastic tubing, and electrical wiring. The choice of cable material will depend in part on the ultimate tensile strength required and considerations of cost, function, availability, durability, and aesthetics.

A cable set 11 should be fixed at both ends to provide rigidity to the roof or covering. An embodiment of the present invention fixes a first end of each cable set 11 to a support member 12 having sufficient integrity to anchor the fabric 10 securely. Support member 12 may take the form of a straight, curved, twisted, or ring-shaped beam, plank, or wall, or may be a tensioned cable secured at both ends to the ground or to a structure. Additionally, support member 12 may take the form of one or more poles, rods, or cable stays secured in the ground or attached to a structure. Attachments to the ground may be made by setting the pole, rod, or cable stay in cement or concrete, for example. A single support member 12 in the form of a pole, rod, or cable stay may support a single cable 14, 16 or 18, an entire cable set 11, or several cable sets 11. A plurality of poles, rods, or cable stay support members 12 may take the place of a single larger support member 12.

In most embodiments the fabric 10 is supported between a first support member 12 and a second support member 12', for example where the first support member 12 is a curved wall and the second support member 12' is a tensioned cable secured at both ends to the ground. Other embodiments, however, utilize a single support member 12 shaped as a ring. Cable sets 11 may be arranged parallel one another within the ring-shaped support member 12 like multiple parallel chords of a circle. Alternately, cable sets 11 may cross at one or more points within the ring-shaped support member 12, with the simplest embodiment having all cable sets 11 crossing at the center of the ring. In embodiments where cable sets 11 cross one another they may be physically joined together at the crossing-points, for example, by clamping or welding. Yet another embodiment substitutes a plurality of poles set into the ground for the ring-shaped support member 12 such that cable sets 11 are strung between the poles.

Support member 12 may have cable sets 11 attached to both sides, for example, where one fabric 10 joins a second fabric 10 along a straight beam to create an inverted V-shaped roof. In some embodiments a cable set 11 attaches to support member 12 such that the plane defined by the cable set 11 intersects at a right angle the plane defined by the surface of the support member 12 at the point of attachment. In other embodiments the plane of the cable set 11 intersects the plane of the support member 12 at non-right angles. A tensioner 25, such as a turnbuckle or other similar devices well known in the art, on each individual cable 14, 16, and 18 may be desirable to hold each individual cable 14, 16, and 18 taught.

FIG. 2 illustrates a panel 20 having a first coupling mechanism 22 located at a first attachment point, a second coupling mechanism 24 located at a second attachment point, a third coupling mechanism 26 located at a third attachment point, and a fourth coupling mechanism 28 located at a fourth attachment point. Each panel 20 spans tnvo adjacent cable sets 11 such that the first coupling mechanism 22 engages the first cable 14 of a cable set 11" and the second coupling mechanism 24 engages the second cable 16 in the same cable set 11", and the third coupling mechanism 26 engages the third cable 18 of an adjacent cable set 11' and the fourth coupling mechanism 28 engages the second cable 16 of the adjacent cable set 11'.

The panel 20 may be formed of many different materials including but not limited to paper, cardboard, cloth, nylon, Kevlar, Rayon, polyearbonate, polypropylene, polyethylene, wood, glass, stained glass, stainless steel, copper, brass, bronze, and aluminum. The choice of panel 20 material will depend in part on the ultimate tensile strength required and considerations of cost, availability, durability, ad aesthetics. Transparent and semi-transparent materials, for example, will pass more light, while metals may be selected for aesthetics and formability. Coatings such as urethane or paint may be applied to panel 20 for improved durability, weather resistance, and appearance. Both the interior and the exterior surfaces of panel 20 may be textured for both utilitarian and aesthetic purposes. For example, a set of grooves on the exterior of panel 20 may help guide rainwater. Similarly, panel 20 may be shaped for both utilitarian and aesthetic purposes. For example, a turned down leading edge on panel 20 may help guide rainwater. Additionally, all panels 20 within a fabric 10 may be identical to one another or may vary in size. For instance, in the aforementioned conical embodiment in which cable sets 11 diverge from one another, the panels 20 near the apex of the cone will have less distance to span between adjacent cable sets 11 than those panels 20 nearer to the ground.

Coupling mechanisms 22, 24, 26 and 28 may be of many forms including apertures, slots, cable ties, hooks, clamps, foldable tabs, and welds. FIG. 2 shows coupling mechanisms 22, 24, 26 and 28 as being the same, specifically a hole or aperture. The present invention does not require each coupling mechanism 22, 24, 26 and 28 be the same, though simplicity in assembly may strongly suggest such uniformity. In embodiments where the coupling mechanism 22, 24, 26 or 28 is an aperture, assembly and positioning of panels 20 may be convenient, however a grommet or plug may be desirable to hold panels 20 securely in place once in position and to prevent water from dripping through. Further embodiments include coupling mechanisms 22, 24, 26 or 28 that are straight, curved, or L-shaped slots cut into the sides of panel 20. As with an aperture coupling mechanism 22, 24, 26 or 28, a grommet or plug may be desirable in combination with a slot-type coupling mechanism 22, 24, 26 or 28. Similarly, a partially cut out aperture may form a tab that can be folded back against individual cables 14, 16, and 18 to hold them more securely. Additional coupling mechanisms 22, 24, 26 and 28 include cable ties that may be twisted around individual cables 14, 16, and 18, and hooks that may be passed through the strands of a braided wire.

Attachment points for coupling mechanisms 22, 24, 26 and 28 may be along the edges of panel 20, for example when a coupling mechanism 22, 24, 26 or 28 is a weld In other embodiments, such as those utilizing apertures, the attachment points for coupling mechanisms 22, 24, 26 and 28 will be within the body of panel 20. More specifically, the locations for attachment points will be logically dictated by the orientation of panel 20 and the spacings between the individual cables 14, 16, and 18. Returning to FIG. 2, it can be seen how the orientation of panel 20 influences the locations of the attachment points. Panel 20 defines a plane that intersects the plane defined by cable set 11'. The line L of intersection forms an angle α to the lines defined by individual cables 14, 16, and 18. This angle can be thought of as the pitch of panel 20. Increasing the pitch of panel 20 necessarily brings the attachment points for coupling mechanisms 22 and 24 closer together, and similarly brings the attachment points for coupling mechanisms 26 and 28 closer together. Increasing the pitch of panel 20 will tend to allow more light and air through the fabric 10.

It can further be seen from FIG. 2 how the locations of the attachment points depend on the spacings between individual cables 14, 16, and 18. Changing the spacing between individual cables 14, 16, and 18 will increase the pitch of panel 20 for the same set of attachment points. On the other hand, to maintain the same pitch of panel 20 while increasing the spacings between individual cables 14, 16, and 18 would require increasing the distances between the attachment points for coupling mechanisms 22 and 24, and similarly between the attachment points for coupling mechanisms 26 and 28. In embodiments of the present invention where cable sets 11 contain cables 14, 16, and 18 that are not parallel, successive panels 20 spanning between two cable sets 11 will each need to have different attachment points to maintain the same pitch. Alternately, for the same arrangement of cable sets 11, maintaining the same arrangement of attachment points for successive panels 20 will provide each panel 20 with a somewhat different pitch.

FIG. 3 illustrates the relationship of adjacent panels 20 within a row 30, and how rows 30 are arranged relative to one another. It can be seen in FIG. 3 that each cable 14 only engages coupling mechanisms 22 on successive panels 20. Likewise, each cable 18 only engages coupling mechanisms 26 on successive panels 20. Cable 16, however, effectively stitches panels 20 together. In FIG. 3 it can be seen that cable 16 alternatively engages coupling mechanism 28 on panel 20' and coupling mechanism 24 on panel 20". In each successive row 30, cable 16 alternatively engages a coupling mechanism 28 on one panel 20' and a coupling mechanism 24 on the adjacent panel 20".

For clarity, FIG. 3 shows substantial separation between successive rows 30. Most embodiments of the present invention place successive rows 30 closer together than illustrated. Placing rows 30 near enough to one another that they overlap provides a fabric 10 that is more resistant to penetration by rain. Rain resistance is also facilitated by increasing the overlap of adjacent panels 20 by widening them in the direction of the row 30, and also by lowering the pitch of the panels 20.

Further embodiments of the present invention are directed to an adjustable fabric 10 where the spacings between cables 14, 16, and 18 for each cable set 11 may be increased or decreased to alter the pitch of the panels 20. In one such embodiment the support member 12 is rotatable around its long axis, where its long axis is defined as the line connecting the attachment points of each cable 16. Rotation of support member 12 around this axis will tend to change the spacings between cables 14, 16, and 18 that will, in turn, alter the pitch of each panel 20. Rotation of support member 12 around this axis, will also, however, tend to create slack in cable 18 while placing tension on cable 14, or vice versa. To avoid this problem, an embodiment that alters the pitch of panels 20 may utilize a tensioner 25 on each cable 14, 16 and 18 to maintain a constant tension on each. The coupling mechanisms 22, 24, 26 and 28 used in this embodiment should be of a type that will allow an attached cable 14, 16 or 18 the ability to slide through without becoming detached, such as a slot or aperture. It may be desirable to make secure attachments to cables 14 and cables 18 while allowing slidable attachments to cables 16. Alternately, attachments to cables 16 may be secure while attachments to the other two cables 14 and 18 may be slidable.

An alternative for providing uniform tension on cables 14 and 18 while rotating support member 12 is to have the second end of each cable set 11 attach to a second support member 12' that is configured to rotate in unison with the first support member 12. In such a configuration, both the first support member 12 and the second support member 12' would, for example, both rotate clockwise by the same number of degrees. Rotation of the two support members 12 and 12' in unison may be accomplished by two electric motors activated by a common controller. In other embodiments the support members 12 and 12' may be linked by gears, pulleys, chains, or levers to allow rotation in unison. Other methods for achieving synchronous rotation well known in the art may also be employed.

Figure 4:
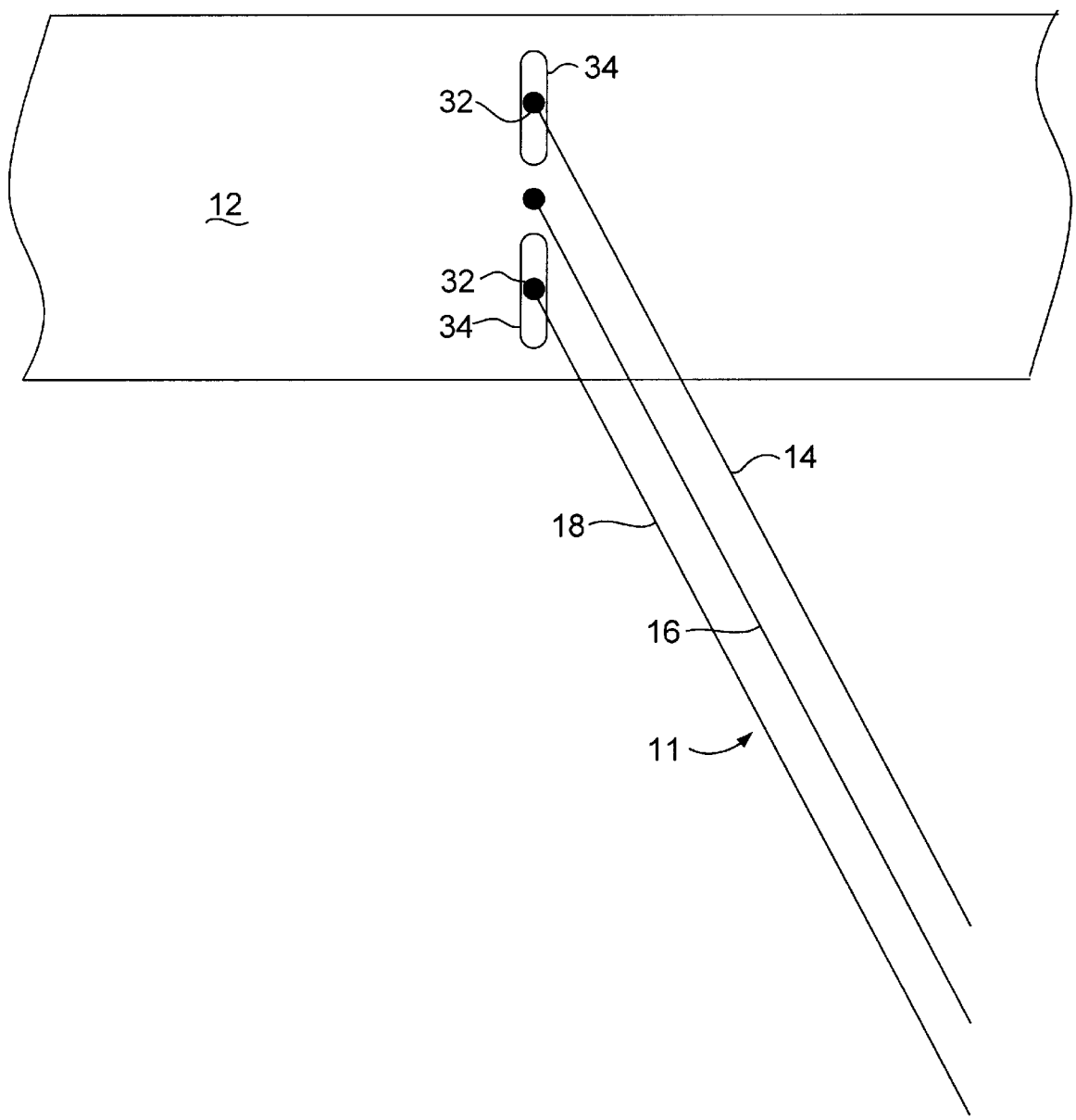
FIG. 4 is an elevational view of a cable set of the present invention configured such that two cables may be repositioned.

A further embodiment of the adjustable fabric 10 varies the pitch of the panels 20 by repositioning the first cable 14 and the third cable 18 relative to the second cable 16 of each cable set. FIG. 4 illustrates one such embodiment in which cables 14 and 18 each attach to separate movable members 32 constrained to move along tracks or within predefined guides 34 on support member 12. Another embodiment suspends the fabric 10 between two support members 12 where both support members 12 are configured with movable members 32 for first cable 14 and third cable 18. As movable members 32 are brought closer to the attachment point of cable 14 the pitch on panels 20 decreases. It should be noted that the guides 34 shown in FIG. 4 are substantially straight and define a line that intersects the attachment point for cable 14, however, other embodiments may utilize curved guides 34. Movable members 32 may be adjusted with the use of cams, gears, pulleys, levers, springs, or other devices known in the art.

Another embodiment repositions cables 14 and 18 by pinching them closer together. For example, a screw-driven clamp, or similar device, situated along a cable set 11 could squeeze the cable set 11 such that cables 14 and 18 move closer to cable 14, thus reducing the spacings between the cables 14, 16, and 18, thereby causing the pitch of the panels 20 to decrease. Two such pinching devices, one placed at either end of each cable set 11, could accomplish the same effect as the adjustable attachment points achieved with the movable members 32 described in the previous embodiment.

Figure 5:
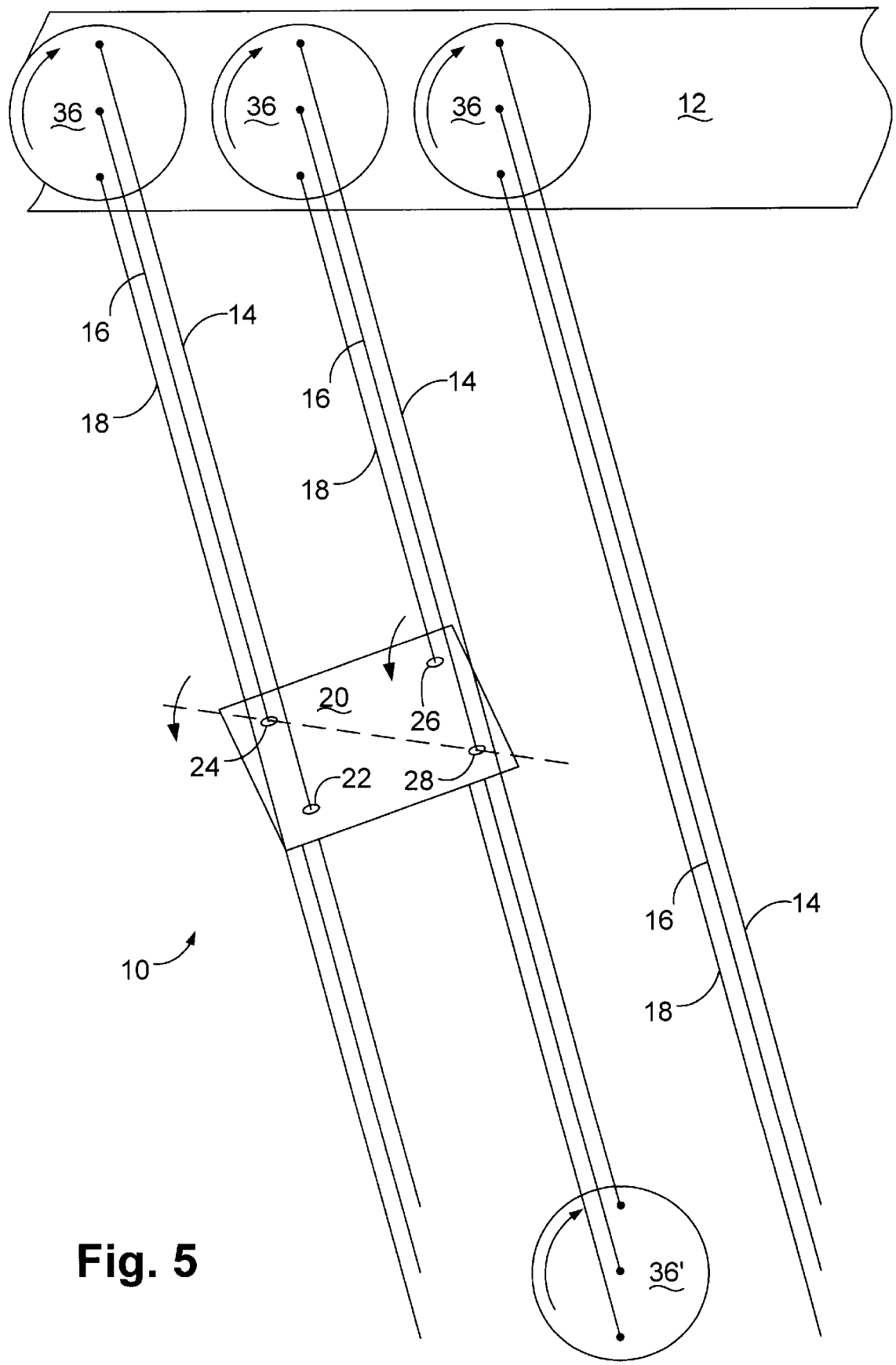
FIG. 5 is an elevational view of cable sets of the present invention configured such that the cable sets may be rotated.

Closing the spacings between panels 20 to achieve greater rain and wind resistance, or otherwise reduce the permeability of the fabric 10 to air and light, may also be accomplished by rotating in unison each cable set 11 around an axis defined by the second cable 14 of each cable set 11. One method for rotating a complete cable set 11 is to attach it to a rotatable member 36 that is affixed to support member 12, as shown in FIG. 5. From the illustration it can be seen that rotating members 36 in unison will have the effect of lowering the pitch of panel 20 while simultaneously causing panel 20 to rotate slightly around the axis defined by the attachment points for coupling mechanisms 24 and 28 as shown. Ideally, a similar rotatable member 36' anchors the second end of each cable set 11 such that rotatable members 36 and 36' at both ends of each cable set 11 rotate in unison in the same direction and through the same angle. Rotatable members 36 and 36' may be rotated in unison with the use of motors, cams, gears, pulleys, levers, springs, or any other mechanism known in the art.

Figure 6A:
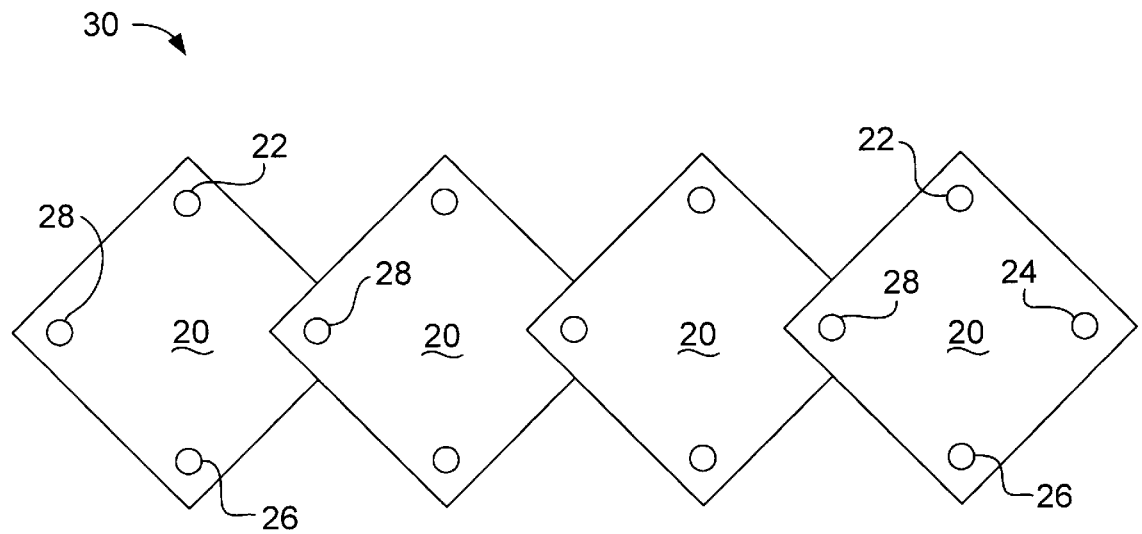
FIGS. 6A and 6B illustrate a method for assembling a fabric of the present invention.
Figure 6B:
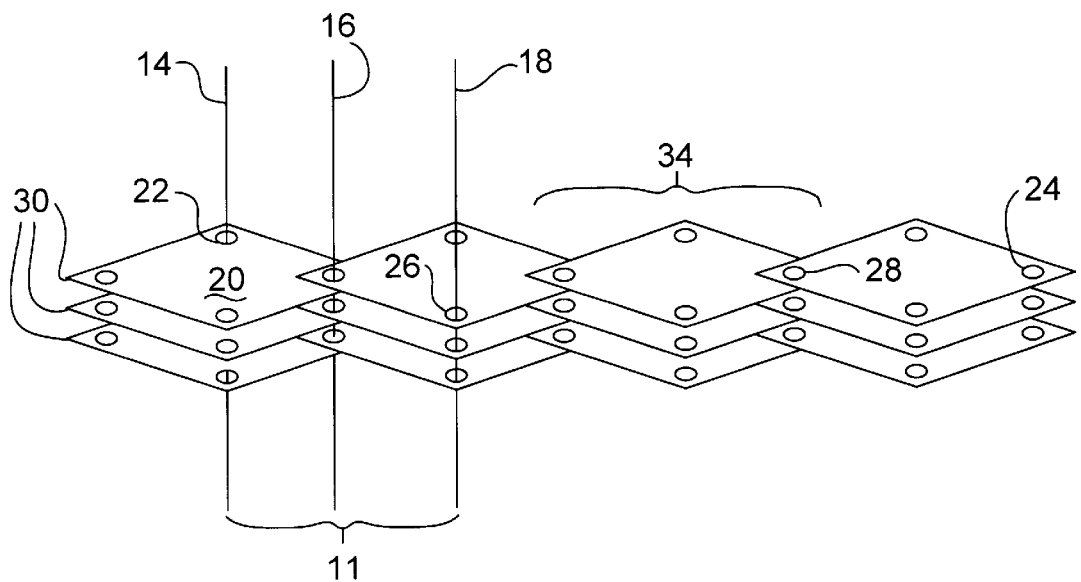

A further embodiment of the present invention is directed to a method for constructing a fabric 10 of cable sets 11 and panels 20. In the disclosed method a first row 30 of panels 20 is assembled such that each panel 20 overlaps an adjacent panel 20 so that the second coupling mechanism 24 of one panel 20 is aligned with the fourth coupling mechanism 28 on an adjacent panel 20, as shown in FIG. 6A. Successive rows 30 of panels 20 are arranged in like manner to the first row 30 and are placed over the first row 30 such that the panels 20 in each row 30 are aligned with the panels 20 in the rows 30 beneath it, as illustrated in FIG. 6B. Further, the set of all similarly situated panels 20 in each of the successive rows 30 constitutes a panel column 34. Cable sets 11, each having a first end and a second end and comprising three cables each, are attached to each panel 20 in two adjacent panel columns 34. The first cable 14 in the cable set 11 attaches to the first coupling mechanism 22 on each panel 20 in one of the two panel columns 34, and the second cable 16 of the set 11 attaches to the second coupling mechanism 24 on each panel 20 in the same column 34. Further, the third cable 18 of the cable set 11 attaches to the third coupling mechanism 26 on each panel 20 in the adjacent panel column 34', and the second cable 16 of the set 11 also attaches to the fourth coupling mechanism 28 on each panel 20 in the adjacent panel column 34'. Once all of the panels 20 are attached to cable sets 11, the first end of each cable set is attached to a first support member 12 and the second end of each cable set is attached to a second support member 12'. Each panel 20 is then positioned such that they are uniformly spaced, specifically so that panels 20 within rows 30 are evenly spaced apart, and so that rows 30 of panels 20 overlap each other by substantially the same amount.

The present invention will be further illustrated by the following examples. These non-limiting examples illustrate some embodiments and are intended to teach those skilled in the art how to put the present invention into practice.

Example 1

Figure 7:
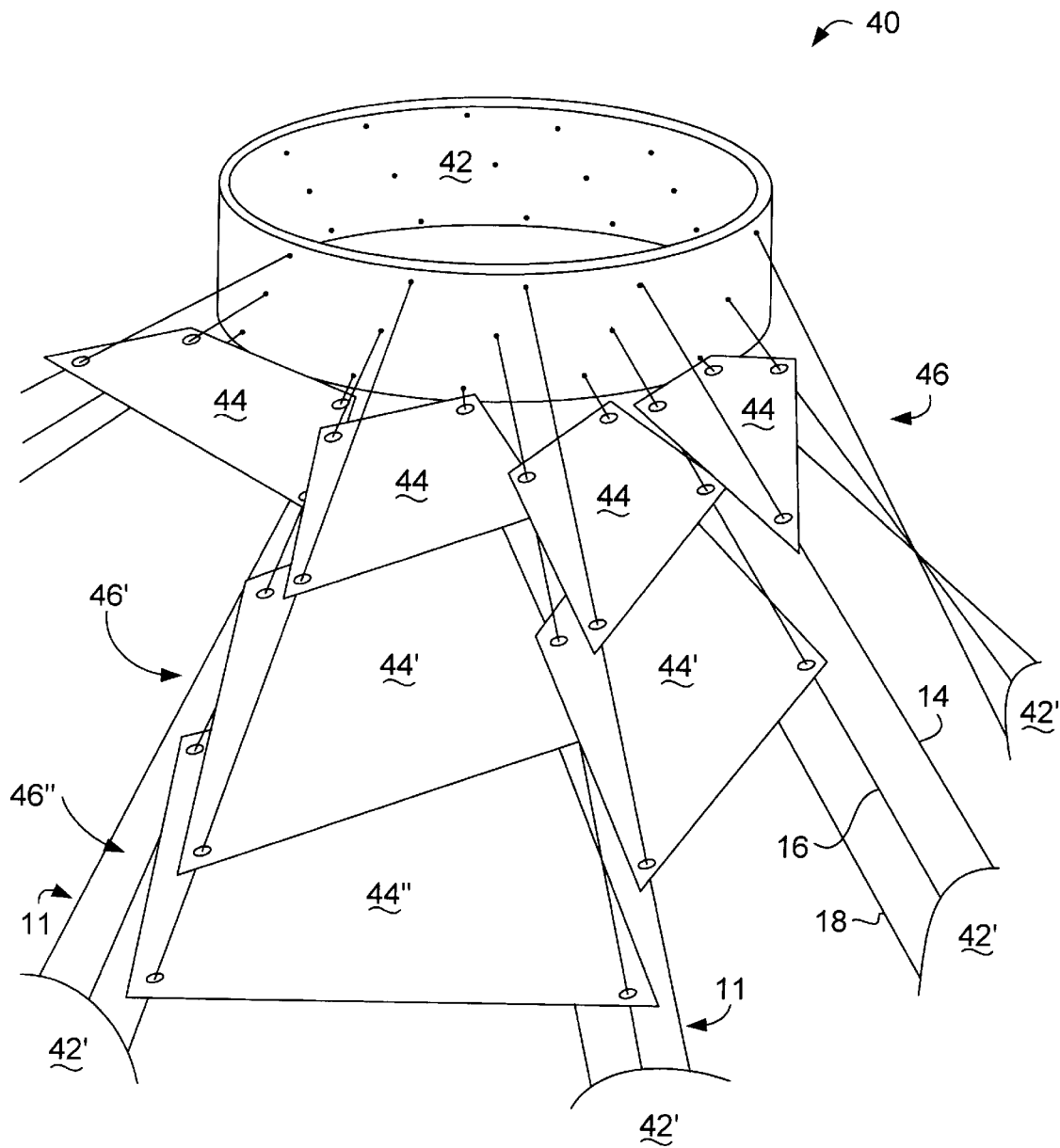
FIG. 7 is an elevational view of a fabric of the present invention formed as a truncated cone.

FIG. 7 illustrates an embodiment of the present invention in which fabric 40 is formed as a truncated cone. For clarity, only a portion of fabric 40 is presented in the illustration. Fabric 40 is supported at the top with a ring shaped support member 42. At the bottom fabric 40 is supported by a plurality of support members 42', which may be, for example, cable stays set into the ground with cement. The first end of each set of cables 11 attaches to support member 42 and the second end of each set of cables 11 attaches to one of the support members 42'. Panels 44 are hung between the sets of cables 11 in overlapping rows 46, 46' and 46". Because the sets of cables 11 are closest together at the top of fabric 40 and furthest apart at the bottom of fabric 40, panels 44 in the topmost row 46 are smallest with panels 44' in the next row 46' being somewhat larger, and so on. Further, because fabric 40 curves to form a truncated cone, it may also be desirable to form the panels 44 with curved surfaces.

Example 2

Figure 8:
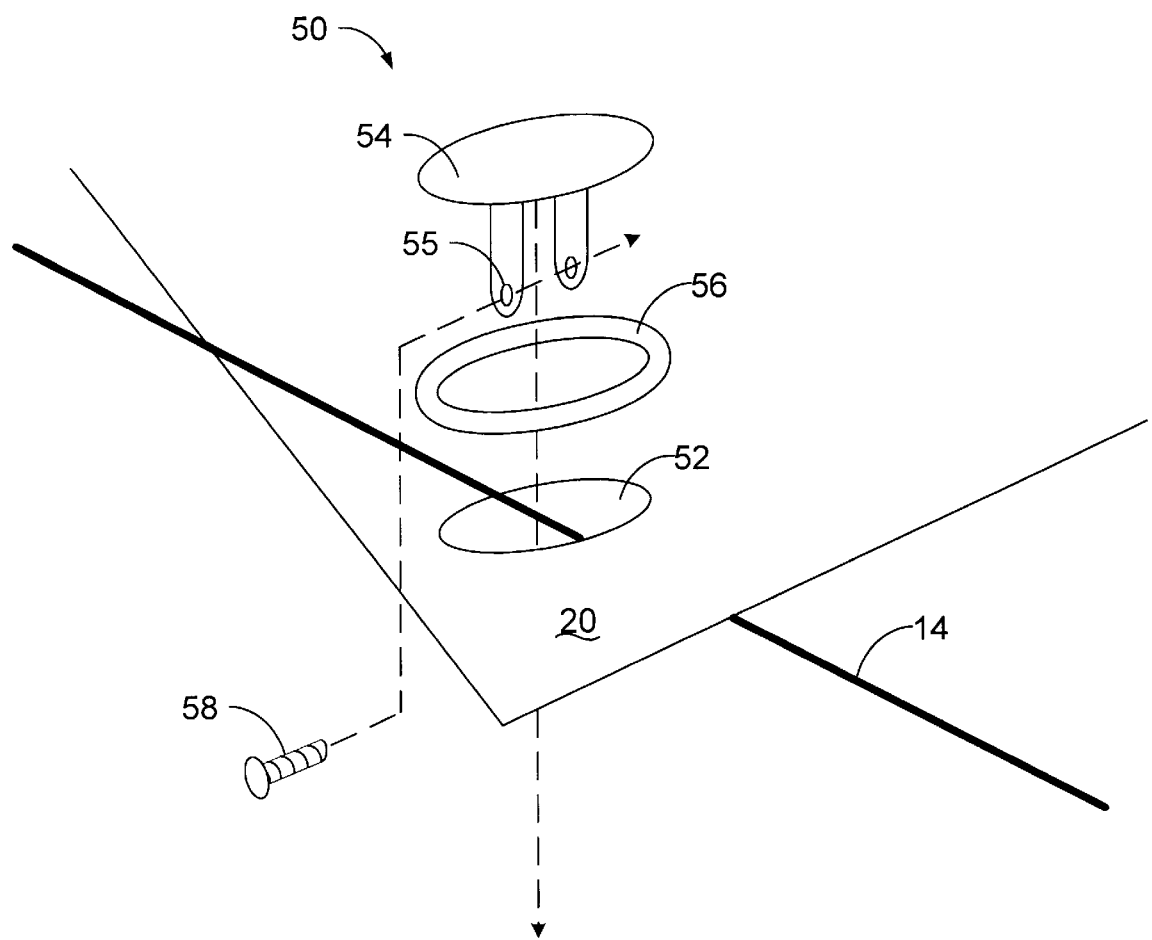
FIG. 8 is an exploded view of a coupling mechanism for securing a panel to a cable.

FIG. 8 illustrates a coupling mechanism 50 of the clamping variety comprising an aperture 52 in panel 20, a brad 54, a grommet 56, and a screw 58. Coupling mechanism 50 may be used to secure panel 20 to, for example, cable 14. As shown in FIG. 8, cable 14 is passed through aperture 52 in panel 20, grommet 56 is placed over aperture 52, and brad 54 is inserted through both grommet 56 and aperture 52. Lastly, screw 58 is inserted through the threaded holes 55 at the ends of the two prongs of brad 54. As screw 58 is tightened it causes brad 54 to press grommet 56 into cable 14, forming a seal. Additionally, as screw 58 is tightened, the two prongs of brad 54 are drawn together tending to clamp cable 14 from below. In this way coupling mechanism 50 serves to both form a seal and secure panel 20 to cable 14.

Example 3

Figure 9:
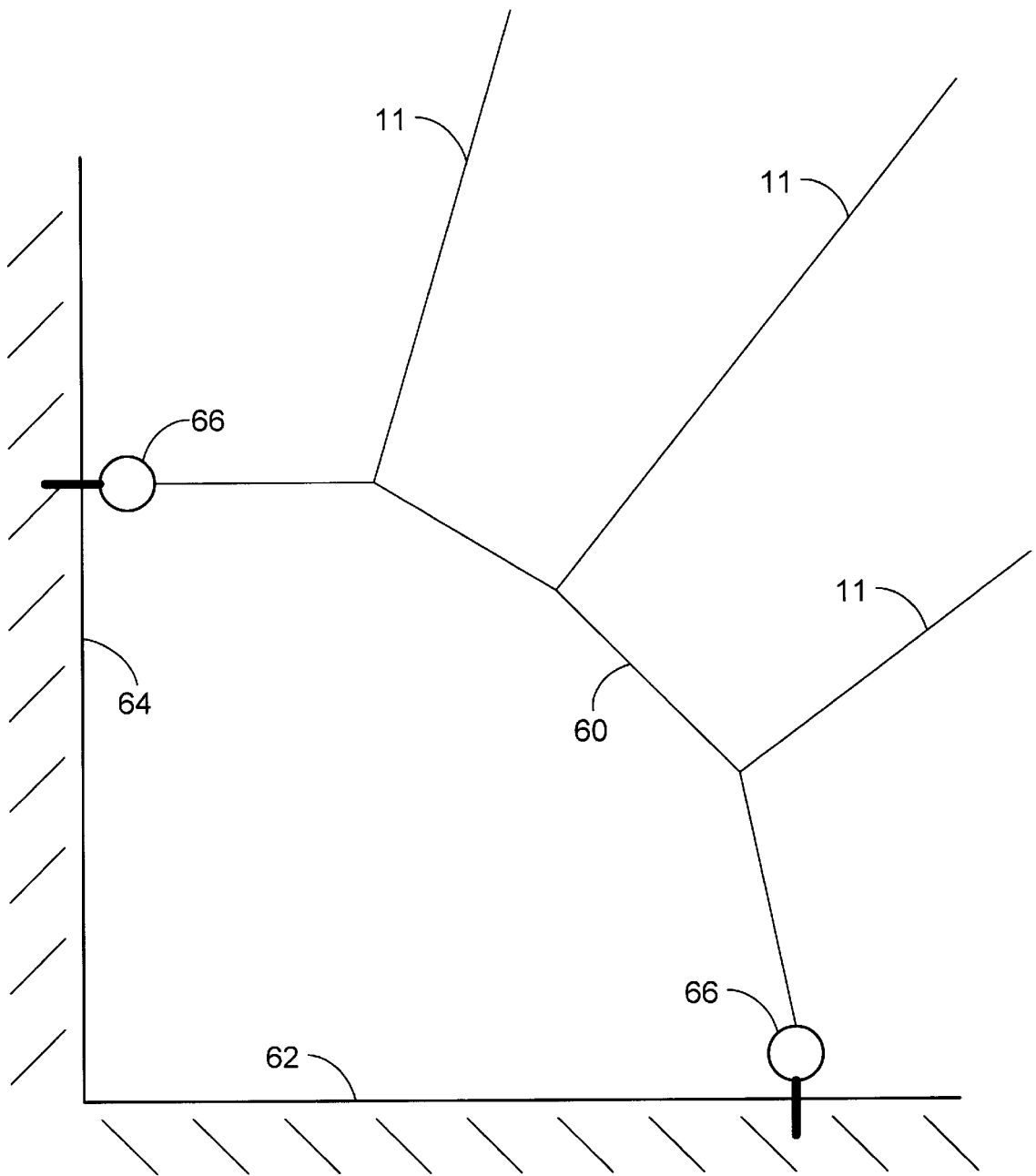
FIG. 9 is a schematic diagram of a tensioned cable support member supporting three cable sets.

FIG. 9 illustrates a tensioned cable 60 support member fixed at one end to the ground 62 with a cable stay 66 and fixed at the other end to a wall 64 with another cable stay 66. A tensioned cable 60 may support a single cable set 11, or a plurality of cable sets 11 as shown. Further, a tensioned cable 60 may extend between two locations on the ground 62 to form an arch, or alternately may extend between two walls 64.

Although the foregoing invention has been described in some detail for the purpose of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A fabric suitable for covering a structure of any shape, said fabric woven to allow the passage of light and air, said fabric comprising:

a plurality of sets of cables, wherein each set of cables includes a first cable, a second cable, and a third cable;

a plurality of panels, wherein each panel has a first coupling mechanism located at a first attachment point, a second coupling mechanism located at a second attachment point, a third coupling mechanism located at a third attachment point, and a fourth coupling mechanism located at a fourth attachment point;

each said panel spans two adjacent said sets of cables such that said first coupling mechanism engages said first cable of a set of cables and said second coupling mechanism engages said second cable in said same set of cables, and said third coupling mechanism engages said third cable of said adjacent set of cables and said fourth coupling mechanism engages said second cable of said adjacent set of cables; and said panels are arranged in a plurality of rows, such that said second cable in each said set of cables alternately engages said second coupling mechanism of one panel in said row and said fourth coupling mechanism of an adjacent panel within said same row.

2. The fabric according to claim 1, wherein said first, second, third, and fourth coupling mechanisms are selected from the group consisting of apertures, slots, cable ties, hooks, clamps, foldable tabs, and welds.

3. The fabric according to claim 1, wherein said panels are fabricated from a material selected from the group consisting of paper, cardboard, cloth, nylon, Kevlar, Rayon, polycarbonate, polypropylene, polyethylene, wood, glass, stained glass, stainless steel, copper, brass, bronze, and aluminum.

4. The fabric according to claim 1, wherein said cables are selected from the group consisting of single-strand wire, braided wire, rope, monofiliment, plastic tubing, and electrical wiring.

5. The fabric according to claim 1, wherein each said cable is provided with a tensioner.

6. The fabric according to claim 1, wherein a first end of each said cable set is fixedly attached to a first support member.

7. The fabric according to claim 1, wherein a first end of each said cable set is fixedly attached to a first support member and a second end of each said cable set is fixedly attached to a second support member.

8. The fabric according to claim 6, wherein said first support is selected from the group consisting of beams, planks, walls, poles, rods, tensioned cables, and cable stays.

9. The fabric according to claim 7, wherein said first support member and said second support member are selected from the group consisting of beams, planks, walls, poles, rods, tensioned cables, and cable stays.

10. The fabric according to claim 6, wherein the pitch of each said panel is adjustable by rotating said first support member around a long axis of said first support member.

11. The fabric according to claim 1, wherein the spacing between adjacent said panels within said row is adjustable by rotating in unison each said cable set around an axis defined by said second cable.

12. The fabric according to claim 1, wherein the spacing between adjacent said rows is adjustable by repositioning said first cable and repositioning said third cable both relative to said second cable of each said cable set.

13. A method for assembling a fabric of cables and panels, comprising:

providing a first row of panels wherein each said panel has a first coupling mechanism, a second coupling mechanism, a third coupling mechanism, and a fourth coupling mechanism, and each said panel overlaps an adjacent said panel such that said second coupling mechanism of each said panel is aligned with said fourth coupling mechanism of said adjacent panel;

placing successive rows of said panels above and aligned with said first row of panels, wherein each said successive row is arranged in like manner as said first row, and a set of similarly situated panels in successive rows constitutes a panel column;

attaching cable sets, each having a first end and a second end, and each comprising first, second, and third cables, to each said panel in two adjacent said panel columns such that said first cable attaches to said first coupling mechanism on each said panel in one said panel column, said second cable attaches to said second coupling mechanism on each said panel in said same panel column, and said third cable attaches to said third coupling mechanism on each said panel in said adjacent panel column, and said second cable also attaches to said fourth coupling mechanism on each said panel in said adjacent panel column; attaching a first support member to said first end of each said cable set; attaching a second support member to said second end of each said cable set; and positioning each said panel such that said panels are uniformly spaced.

\* \* \* \* \*